3,232,950
5-(2'-PICOLYL)-5-HYDROXY-DIBENZO[a,d]CYCLO-HEPTA[1,4]DIENE AND ACID ADDITION SALTS THEREOF

Frank J. Villani, West Caldwell, N.J., assignor to Schering Corporation, Bloomfield, N.J., a corporation of New Jersey
No Drawing. Filed Jan. 31, 1962, Ser. No. 170,859
3 Claims. (Cl. 260—297)

This invention relates to 5-(2'-picolyl(-5-hydroxy-dibenzo[a,d]cyclohepta[1,4]diene including its non-toxic acid addition salts, and to the processes for making and using such compositions.

The invention sought to be patented in its composition of matter aspect resides in the concept of the chemical compound 5-(2'-picolyl)-5-hydroxy-dibenzo[a,d]cyclohepta[1,4]diene of the structural formula:

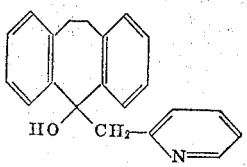

which concept includes the non-toxic acid addition salts thereof. The nomenclature assigned to the chemical compounds of this invention is in accordance with that employed by the subject index of Chemical Abstracts (1956) wherein compounds are named as derivatives of dibenzo[a,d]cyclohepta[1,4]dienes.

The tangible embodiments of the compositions of matter of this invention possess the inherent applied use characteristic of exerting an anti-depressant effect in mammals. Therefore, in its process-of-use aspect, this invention embraces the concept of administering a therapeutically effective quantity of 5-(2'-picolyl)-5-hydroxy-dibenzo[a,d]cyclohepta[1,4]diene either as the free base or in the form of an acid addition salt thereof, to achieve an anti-depressant effect in depressed-state mammals.

The manner and process of making and using the invention will now be desscribed so as to enable one skilled in the art to make and use the same.

EXAMPLE 1
*Preparation of 5-(2'-picolyl)-5-hydroxy-dibenzo[a,d]cyclohepta[1,4]diene*

Into a vessel containing 5.5 g. of lithium shot and 400 ml. of ether, add (in a dropwise fashion) a solution containing 62.6 g. of bromobenzene in 400 ml. of ether and picoline and gently reflux the resulting mixture for about one-half hour. In a portionwise fashion, add 36.8 g. of 2-picoline and gently reflux the resulting mixture for about one hour. Add 41.6 g. of dibenzo[a,d]cyclohepta[1,4]diene-5-one (previously dissolved in 50 ml. of ether), stir the resulting mixture at room temperature for about 4–6 hours, and allow the stirred mixture to stand overnight. Decompose the reaction mixture with water and extract the organic material with ether. Extract the organic material (from the ether extract) with 10% hydrochloric acid, wash the acid solution with ether, neutralize with ammonium hydroxide and extract the organic material with chloroform. Evaporate off the excess chloroform, dissolve the residue in benzene and treat the resulting solution with petroleum ether to yield a product having a melting point of 108–110° C. Recrystallize the crude product from benzene-petroleum ether to yield 5-(2'-picoyl) - 5 - hydroxy-dibenzo[a,d]cyclohepta[1,4]diene, melting point 113–115° C.

EXAMPLE 2
*5-(2'-picolyl)-5-hydroxy-dibenzo[a,d]cyclohepta[1,4]diene hydrochloride.*

A saturated solution of hydrogen chloride in ethanol is added to a solution containing 7.5 g. of 5-(2'-picolyl)-5-hydroxy-dibenzo[a,d]cyclohepta[1,4]diene until precipitation is complete. The precipitated product is filtered, washed with ether and recrystallized from a 50/50% mixture of absolute ethanol and absolute ether to yield 5-(2'-picolyl)-5-hydroxy-dibenzo[a,d]cyclohepta[1,4]diene hydrochloride.

Other inorganic acid addition salts of 5-(2'-picolyl)-5-hydroxy-dibenzo[a,d]cyclohepta[1,4]diene, such as those formed from hydrobromic acid, phosphoric acid, sulfuric acid, and the like may be prepared by analogous procedures well-known to those skilled in the art.

Having set forth the details as to how the compounds of this invention are to be made, the inventor will now set forth the manner and method for using such compounds.

While moderate success has been achieved in the treatment of psychopharmacological depression in mammals with some of the presently used anti-depressant compounds, the success has been limited to a relatively small percentage of the depression-states. As a consequence, there exists a need for agents which are more generally applicable, as well as for agents which produce fewer undesirable autonomic and neurologic side-effects. It is therefore an object of this invention to provide a novel composition of matter that will satisfy such needs. Such an object is accomplished by the composition of this invention.

Using standard techniques and standard procedures, the toxicity of the compound of this invention was first evaluated in mice, and then in dogs, with favorable results. Effective anti-depressant activity in mammals may be evidenced by laboratory and clinical techniques wherein a depressed subject's reaction to the compositions of this invention is compared to the subject's reactions to chemical compounds known to have an anti-depressant effect. From these tests (tests, for example, such as those found described or referred-to in such articles as by D. R. Maxwell, H. T. Palmer, Nature, 191, 84 (1961) and by L. Stein, J. Seifter, Science, 134, 286 (1961)) it has been concluded that the compositions of this invention, in their effect upon the central nervous system, cause stimulated effects and altered performance of depressed subjects with few side-effects, and therefore, are useful in the treatment of psychopharmacological depression in mammals caused by both laboratory-induced conditions and by multifarious modern-day stimuli.

The effective dosage of the active ingredient of the composition of this invention depends upon the severity, the stage, and the individual characteristic of each case and will be determined by the attending diagnostician. Generally, a dosage range of from about 0.5 mg. to about 5 mg. per kg. of body weight per day constitutes the overall range, with a range of from about 0.5 mg. to 5 mg. per kg. per day for the preferred form of active ingredient.

The compounds of my invention may be used in the form of pharmaceutical preparations which contain the new compound in admixture with a pharmaceutical carrier suitable for enteral or parenteral administration. In their preferred dosage unit forms the active ingredient is present in amounts of about 5 to 150 mg. Such preparations may be in solid forms, as for example tablets and capsules, or in liquid forms, as for example syrups, elixirs, emulsions, and injectables.

In the formulation of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following examples will serve to further exemplify the nature of these various formulations. These examples, however, are not intended and should not be construed in any way so as to limit the scope of the product formulation.

EXAMPLE 3

SYRUP, 25 MG./TEASPOONFUL

| Ingredient: | Quantity |
|---|---|
| 5-(2'-picolyl)-5-hydroxy-dibenzo[a,d]cyclohepta[1,4]diene _gm_ | 5.0 |
| Citric acid _gm_ | 5.0 |
| Sodium citrate _gm_ | 1.0 |
| Sodium benzoate _gm_ | 1.0 |
| Sweet orange peel tincture _ml_ | 50.0 |
| Sucrose _gm_ | 800.0 |
| Purified water, q.s. to make _liter_ | 1.0 |

Dissolve successively the 5(2'-picolyl)-5-hydroxy-dibenzo[a,d]cycloheptal[1,4]diene, citric acid, sodium citrate, sodium benzoate and sucrose in sufficient water to make approximately 900 ml. Add the sweet orange peel tincture and sufficient water to make the product measure one liter. Agitate until uniform. Filter, using an appropriate filter aid if necessary, until the product is clear.

EXAMPLE 4

INJECTABLE, 10 MG./ML.

| Ingredient: | Quantity |
|---|---|
| 5-(2'-picolyl)-5-hydroxy-dibenzo[a,d]cyclohepta[1,4]diene _gm_ | 10.0 |
| Sodium chloride, U.S.P. _gm_ | 9.0 |
| Methyl paraben _gm_ | 1.8 |
| Propyl paraben _gm_ | 0.2 |
| Benzyl alcohol, R.G. _gm_ | 9.0 |
| Water for injection q.s. to make _liter_ | 1.0 |

Dissolve methyl and propyl parabens in the benzyl alcohol with the aid of heat and agitation. Add this solution to a volume of water for injection equal to 90% of the desired final volume and dissolve with agitation. Add and dissolve the sodium chloride. Add and dissolve the 5-(2'-picolyl)-5-hydroxy-dibenzo[a,d]cyclohepta[1,4]diene. Add water for injection q.s. to final volume. Filter aseptically through appropriate sterile filter. Fill aseptically into 10 ml. rubber stoppered vials.

EXAMPLE 5

TABLETS, 25 MG.

| Ingredient: | Quantity, gm. |
|---|---|
| 5-(2'-picolyl)-5-hydroxy-dibenzo[a,d]cyclohepta[1,4]diene | 250.0 |
| Lactose | 1000.0 |
| Corn starch | 600.0 |
| Corn starch as 10% paste | 50.0 |

Mix the 5-(2'-picolyl)-5-hydroxy-dibenzo[a,d]cyclohepta[1,4]diene, lactose and corn starch, and pass through a pulverizing mill if necessary. Granulate the mix with the starch paste and add additional water if necessary to make a damp granulation. Pass the granulation through an impact mill to produce 8–12 mesh granules. Spread the granulation on trays and dry in a draft-oven at 35–40° C. Reduce the dried granulation to 16–24 mesh. Blend the foregoing 1900 grams of "wet" granulation with 80.0 gm. of corn-starch and 20.0 g. of magnesium stearate until a uniform mixture is obtained. Compress to 200 mg. tablets on 5/16 inch round punches.

The invention may be otherwise variously embodied within the scope of the appended claims.

I claim:

1. A compound selected from the group consisting of 5-(2'-picolyl) - 5 - hydroxy-dibenzo[a,d]cyclohepta[1,4]diene and the non-toxic acid addition salts thereof.

2. 5-(2'-picolyl) - 5 - hydroxy-dibenzo[a,d]cyclohepta[1,4]diene.

3. 5-(2'-picolyl) - 5 - hydroxy-dibenzo[a,d]cyclohepta[1,4]diene hydrochloride.

References Cited by the Examiner

UNITED STATES PATENTS

| 2,509,171 | 5/1950 | Ruzicka et al. | 260—297 |
| 2,512,660 | 6/1950 | Mahan | 260—297 |
| 2,804,422 | 8/1957 | Schumann et al. | 167—65 |
| 2,902,404 | 9/1959 | Spencer | 167—65 |
| 2,985,660 | 5/1961 | Judd | 260—293 |
| 3,073,847 | 1/1963 | Doebel et al. | 260—313 |

OTHER REFERENCES

German (Auslegeschrift), 1,109,166, June 22, 1961.
Winthrop et al.: J. Org. Chem., vol. 27, pp. 230–240 January 18, 1961.

WALTER A. MODANCE, *Primary Examiner.*

IRVING MARCUS, NICHOLAS S. RIZZO, *Examiners.*

UNITED STATES PATENT OFFICE
CERTIFICATE OF CORRECTION

Patent No. 3,232,950　　　　　　　　　　　　February 1, 1966

Frank J. Villani

It is hereby certified that error appears in the above numbered patent requiring correction and that the said Letters Patent should read as corrected below.

Column 1, line 54, strike out "picoline and gently reflux the resulting mixture" and insert instead -- maintain the resulting mixture at gentle reflux --.

Signed and sealed this 24th day of January 1967.

(SEAL)
Attest:

ERNEST W. SWIDER　　　　　　　　　　　　EDWARD J. BRENNER
Attesting Officer　　　　　　　　　　　　Commissioner of Patents